United States Patent
Boerstoel et al.

(10) Patent No.: US 12,467,162 B2
(45) Date of Patent: Nov. 11, 2025

(54) CONTINUOUS PROCESS FOR RECYCLING

(71) Applicant: TEIJIN ARAMID B.V., Arnhem (NL)

(72) Inventors: Hanneke Boerstoel, Arnhem (NL); Wido Nijenhuis, Huissen (NL); Rene La Faille, Zwolle (NL); Rasid Günes, Arnhem (NL); Said Boudebah, Arnhem (NL); Bert Gebben, Velp (NL); Stan Maassen, Zeist (NL); Naoya Komiya, Osaka (JP)

(73) Assignee: TEIJIN ARAMID B.V., Arnhem (NL)

( * ) Notice: Subject to any disclaimer, the term of this patent is extended or adjusted under 35 U.S.C. 154(b) by 404 days.

(21) Appl. No.: 17/786,225

(22) PCT Filed: Dec. 18, 2020

(86) PCT No.: PCT/EP2020/087083
§ 371 (c)(1),
(2) Date: Jun. 16, 2022

(87) PCT Pub. No.: WO2021/123210
PCT Pub. Date: Jun. 24, 2021

(65) Prior Publication Data
US 2023/0037211 A1 Feb. 2, 2023

(30) Foreign Application Priority Data
Dec. 20, 2019 (EP) .................... 19218737

(51) Int. Cl.
| | |
|---|---|
| *D01D 5/06* | (2006.01) |
| *C08J 11/08* | (2006.01) |
| *D01D 1/02* | (2006.01) |
| *D01F 6/60* | (2006.01) |
| *D01F 6/90* | (2006.01) |
| *D01F 6/92* | (2006.01) |
| *B29K 105/26* | (2006.01) |

(52) U.S. Cl.
CPC ............ *D01F 6/905* (2013.01); *C08J 11/08* (2013.01); *D01D 1/02* (2013.01); *D01F 6/605* (2013.01); *D01F 6/92* (2013.01); *B29K 2105/26* (2013.01); *C08J 2377/10* (2013.01); *D10B 2331/021* (2013.01); *D10B 2401/063* (2013.01); *D10B 2501/04* (2013.01)

(58) Field of Classification Search
CPC ... B29K 2105/26; C08J 11/08; C08J 2377/10; D01D 1/02; D01D 5/06; D01F 6/605; D01F 6/905; D01F 13/04; D10B 2331/021

USPC ................ 264/37.28, 184, 331.19, 913, 920; 521/49.8
See application file for complete search history.

(56) References Cited

U.S. PATENT DOCUMENTS

| | | |
|---|---|---|
| 2,999,788 A | 9/1961 | Winthrop |
| 3,414,645 A | 12/1968 | Morgan, Jr. |
| 4,016,236 A | 4/1977 | Nagasawa et al. |
| 6,952,915 B2 | 10/2005 | Prickett |
| 2005/0144928 A1 | 7/2005 | Nuesch |
| 2007/0087178 A1* | 4/2007 | Hendriks ................ D01F 6/605 264/178 F |
| 2013/0075950 A1* | 3/2013 | Knoff ..................... D01F 6/905 264/184 |

FOREIGN PATENT DOCUMENTS

| | | | |
|---|---|---|---|
| CN | 102560748 A | 7/2012 | |
| CN | 102560748 B * | 6/2013 | |
| CN | 103772895 A | 5/2014 | |
| CN | 106564134 A | 4/2017 | |
| DE | 10201869 A1 * | 7/2003 | ......... B29K 2105/26 |
| JP | S51-93955 A | 8/1976 | |
| JP | H03-51382 A | 3/1991 | |
| JP | H07-286061 A | 10/1995 | |
| JP | 2006-241271 A | 9/2006 | |
| JP | 2010-518187 A | 5/2010 | |
| JP | 2013-209776 A | 10/2013 | |
| KR | 100762852 B1 | 10/2007 | |
| RU | 2210649 C2 | 8/2003 | |
| WO | 1996/034732 A1 | 11/1996 | |
| WO | 2008/095632 A1 | 8/2008 | |

OTHER PUBLICATIONS

Translation of DE 10201869 A1 (published on Jul. 31, 2003).*
Apr. 21, 2021 International Search Report issued in International Patent Application No. PCT/EP2020/087083.
Apr. 21, 2021 Written Opinion issued in International Patent Application No. PCT/EP2020/087083.
26, 2024 Office Action Issued in Chinese Patent Application No. 202080087581.0.

* cited by examiner

Primary Examiner — Leo B Tentoni
(74) Attorney, Agent, or Firm — Oliff PLC

(57) ABSTRACT

A continuous process for the recycling of aramid fiber comprising the following steps: combining aramid fibrous material including non-continuous aramid fibers with sulfuric acid to obtain a spin dope comprising aramid, and processing the spin dope including aramid into a continuous aramid fiber. The invention also pertains to a continuous aramid fiber, preferably obtainable by said process, and to a multifilament yarn including the continuous aramid fiber.

13 Claims, 1 Drawing Sheet

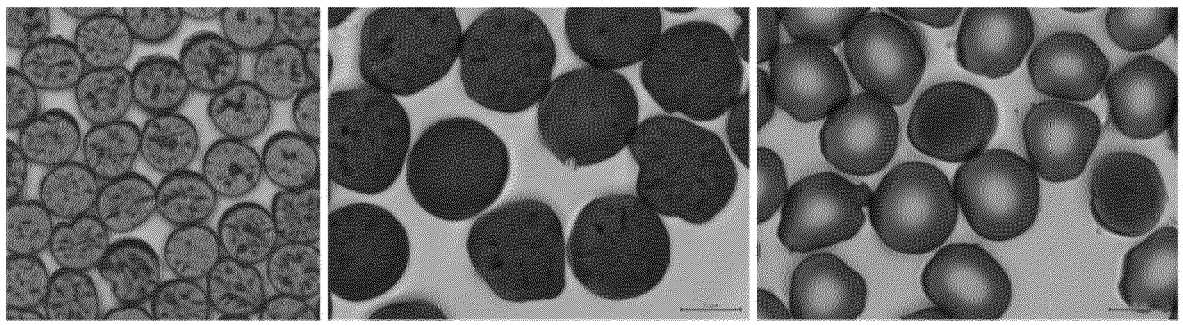

CONTINUOUS PROCESS FOR RECYCLING

The application relates to a continuous process for the recycling of aramid fibrous material, to a continuous aramid fiber obtainable by such process, to a continuous aramid fiber comprising a blend of polymers, to a multifilament yarn comprising either of the fibers and to textile sheets and protective clothing.

Aramid fibers are used for a large variety of applications, including textiles, nonwovens, ropes, fiber-reinforced composites, cables, penetration-resistant materials (e.g. antiballistic vests), tires and conveyor belts.

With increased ecological awareness it is desirable to reduce waste disposal of end-of-life products and also reduce the carbon foot print by reducing the amount of virgin aramid fiber (i.e. aramid fibers produced from 100% newly produced polymer) through recycling of aramid fibers.

A well-known way to recycle aramid fibers is by producing pulp, i.e. fibrillated short fibers from aramid short-cut. However, pulp is only suitable for a number of applications. Furthermore, pulp is commonly used in small percentages in composite materials, making it difficult to recycle pulp after use. This limits the number of times the aramid can be recycled through the pulp process.

CN106564134A describes a process for treating para-aramid spinning waste in the form of solid polymer clumps, wherein the spinning waste is crushed by a horizontal centrifugal crusher, transferring the broken scraps to a digestion tank wherein the broken scraps are subjected for 50 to 200 hours to an acidic treatment at a temperature in the range of 100 to 300° C. under stirring, introducing the treated broken scraps into a neutralization tank where hydroxide solution is added for neutralization and filtering the suspension after neutralization. This process is not efficient and economical and requires additional chemical treatment steps.

CN102560748 describes a discontinuous process to recycle continuous para-aramid yarn or spin dope waste from the production. The process requires an elaborate pre-treatment of the continuous aramid yarn including unwinding of the yarn, drying, soaking in saturated NaHCO$_3$ solution for several hours and washing, before sulfuric acid is added to the continuous yarn to dissolve the yarn. The process results in a yarn which is suitable for staple fiber production.

JP2006241271 discloses a process for the recycling of aramid copolymer yarn. The yarn preferably is yarn which has not been heat drawn, i.e. production waste. The fibers are brought into contact with an organic amide solvent containing an inorganic salt, preferably NMP in combination with LiCl or CaCl$_2$, and mixed at increased temperature.

There is a need for a continuous, efficient recycling process which can utilize a broad range of aramid materials in various forms as input and which results in high quality continuous aramid fibers which may be used in a wide range of application areas and which may have mechanical properties comparable to virgin aramid fibers.

To this end, present application provides a continuous process for the recycling of aramid fiber comprising the following steps:
combining aramid fibrous material comprising non-continuous aramid fibers with sulfuric acid to obtain a spin dope comprising aramid, and
processing the spin dope comprising aramid into a continuous aramid fiber.

The aramid fibrous material used as starting material for the instant process comprises non-continuous aramid fibers.

Non-continuous aramid fibers have a length (or largest dimension) of at most 100 cm, preferably at most 50 cm, more preferably at most 20 cm, even more preferably at most 10 cm, or up to 5 cm.

Fibers are to be understood as relatively flexible units of matter having a high ratio of length to width (across their cross-sectional area, perpendicular to their length).

The process results in continuous aramid fibers, i.e. aramid fibers having a length of more than 100 cm. Usually, continuous fibers or filaments are of practically unlimited length, as obtained by a continuous spinning process. Preferably, the continuous aramid fiber resulting from the process is multifilament yarn.

In the context of this application the term "length" refers to the length weighted length (LL) for short fibers and the mean length for longer fibers. For short fibers (and pulp, fibrils and fibrids) up to a length of 6 mm the length weighted length may be determined by using the Pulp Expert™ FS (ex Metso), including particles with a length <250 micron.

For longer fibers (>6 mm) the length refers to the average fiber length by number (mean length, ML), which may be calculated by:

$$ML = \frac{\sum_{0}^{\infty} n \cdot L_n}{N}$$

where, n is the number of fibers of a certain length $L_n$, and N is the total number of fibers. The mean length may be determined with a fiber length distribution tester, such as a Classifiber (ex Kaisokki).

The terms "aramid spin dope" and "spin dope comprising aramid" may be used interchangeably in the instant description.

Brief description of the drawing: FIG. 1 shows the effect of the continuous aramid fiber, in particular the meta-aramid blend fiber, having improved dyeing behavior such as dye penetration, in particular when cationic dyes are used. FIG. 1 shows cross sectional microscopic images of the continuous aramid fiber obtained by the process before (left panel) and after (middle panel) dyeing in comparison to a conventional meta-aramid fiber dyed with the same dye (right panel).

The aramid fibrous material as one of the starting materials of instant process is usually obtained from or comprises to-be-recycled aramid fiber. The aramid fibrous material may be derived from post-customer aramid waste material, i.e. materials which have been used in products and which have reached their end-of-lifetime, including but not limited to ropes, penetration-resistant articles (e.g. ballistic vests), fabrics (woven or knitted), nonwovens, papers, composites including aramid fibers, cables, reinforcement layers in tires, optical fiber cables, (umbilical) hoses, uni-directional shields, etc. Such waste materials may comprise other materials than aramid and/or may also include fibers other than aramid fibers, e.g. hybrid fiber or hybrid fabric materials including aramid fibers and polyamide fibers or polyethylene terephthalate fibers.

The aramid fibrous material may also be derived from pre-customer aramid waste material, i.e. waste materials created during the production process, e.g. aramid fiber waste created during production or converting processes or aramid yarn having low quality.

Depending on the form of the to-be-recycled waste material, the waste material may be subjected to a size-reducing step to obtain the aramid fibrous material, e.g. by cutting, chopping, breaking, milling, shredding, hammering or a combination of such methods. Also, hazardous components (e.g. finishes) may be removed from the to-be-recycled waste material or the aramid fibrous material prior to starting the process. Preferably, the pre-treatment and the process do not comprise an alkaline treatment of the material-to-be recycled or the aramid fibrous material before being contacted with sulfuric acid.

The aramid fibrous material comprises non-continuous aramid fiber which may e.g. be in the shape of short-cut, pulp, pieces of woven or knitted fabric, pieces of non-woven or pieces of paper or any mixture thereof. In addition to non-continuous aramid fiber, the aramid fibrous material may comprise other, non-aramid fibers and non-fibrous material, the latter including virgin aramid polymer and/or non-fibrous material derived from the to-be-recycled material. Non-continuous aramid fiber and other optionally present fibers together form the fibrous component of the aramid fibrous material.

The aramid fibrous material may comprise at least 50 wt % of non-continuous aramid fiber, preferably at least 70 wt % of non-continuous aramid fiber, preferably at least 80 wt % or even at least 90 wt % of non-continuous aramid fiber (based on the weight of the aramid fibrous material).

The aramid fibrous material may comprise at least 50 wt % of non-continuous aramid fiber, preferably at least 70 wt % of non-continuous aramid fiber, preferably at least 80 wt % or even at least 90 wt % of non-continuous aramid fiber (based on the weight of fibrous component of the aramid fibrous material).

The aramid fibrous material may comprise at least one type of fiber other than aramid fibers (referred to as non-aramid fibers), for example at most 50 wt % of non-aramid fibers, preferably at most 30 wt % of non-aramid fibers, more preferably at most 20 wt %, more preferably at most 10 wt % or most preferably at most 5 wt % of non-aramid fibers (based on the weight of the aramid fibrous material).

The aramid fibrous material may comprise at least one type of fiber other than aramid fibers (referred to as non-aramid fibers), for example at most 50 wt % of non-aramid fibers, preferably at most 30 wt % of non-aramid fibers, more preferably at most 20 wt %, more preferably at most 10 wt % or most preferably at most 5 wt % of non-aramid fibers (based on the weight of the fibrous component of the aramid fibrous material).

The aramid fibrous material may comprise at least one of the following non-aramid fibers: thermoplastic fibers, natural fibers, regenerated fibers or fibers made from rigid rod polymers other than aramid.

Thermoplastic fibers are well known and include e.g. acrylic fibers (e.g. modacrylic fibers), polyamide fiber (such as e.g. Nylon fibers) and polyester fibers. Natural and regenerated fibers include e.g. cotton fibers, cellulose fibers, viscose fibers, (e.g. Rayon or Lyocell fibers). Rigid rod polymer fiber other than aramid fibers are e.g. polybenzimidazole (PBI) fibers and polybenzobisoxazole (PBO) fibers. For example, the aramid fibrous material may comprise aramid fiber, preferably meta-aramid fiber, and non-aramid fibers. Preferably, the non-aramid fiber is selected from at least one of a natural fiber, a regenerated fiber, a thermoplastic fiber and a fiber made from a rigid rod polymer other than aramid.

Even though it is preferred that the aramid fibrous material and the fibrous component of the aramid fibrous material comprise a majority of aramid fibers, instant process may in one embodiment also be applied to aramid fibrous material which comprises 1-99 wt % of aramid fiber, preferably meta-aramid fiber, and 99-1 wt % of non-aramid fiber, preferably 20-80 wt % aramid fiber, more preferably meta-aramid fiber, and 80-20 wt % non-aramid fiber (based on the weight of the aramid fibrous material or based on the weight of the fibrous component of the aramid fibrous material).

The aramid fibrous material may comprise a combination of meta-aramid fiber, para-aramid fiber and non-aramid fiber, the non-aramid fiber preferably selected from a natural fiber, a regenerated fiber and/or a thermoplastic fiber. Preferably, the aramid fibrous material comprises less than 20 wt % of thermoplastic fibers. In one embodiment, the aramid fibrous material comprises meta-aramid fiber, para-aramid fiber and non-aramid fiber, preferably an antistatic non-aramid fiber.

Preferred is an embodiment wherein the aramid fibrous material comprises 50-98 wt % meta-aramid fiber, 1-49 wt % para-aramid fiber and 1-49 wt % non-aramid fiber, preferably 55-95 wt % meta-aramid fiber, 3-10 wt % para-aramid and 2-35 wt % non-aramid fiber (based on the weight of the aramid fibrous material or based on the weight of the fibrous component of the aramid fibrous material).

In one embodiment, the aramid fibrous material or the fibrous component of the aramid fibrous material comprises 65 to 95 wt % of meta-aramid fibers, 1 to 34 wt % of para-aramid fibers and 1 to 4 wt % of antistatic fibers (e.g. polyester-based, polyimide-based or acrylic-based antistatic fibers), in particular 93 wt % of meta-aramid fibers, 5 wt % of para-aramid fibers and 2 wt % of antistatic fibers. Antistatic fibers may include electrically conductive acrylic fiber, e.g. a fiber obtained by kneading electrically conductive carbon into an acrylic fiber, a sheath-core conjugate fiber including a core part containing electrically conductive microparticles and a sheath part not containing electrically conductive microparticles, or the like. In particular, the antistatic fiber may be a sheath-core conjugate fiber (or eccentric sheath-core conjugate fiber), in which the sheath part is made of acrylic not containing electrically conductive microparticles, while the core part is made of an electrically conductive carbon-containing polymer, or the like.

In another embodiment, the aramid fibrous material comprises para-aramid fiber and a fiber made from a rigid rod polymer other than aramid (e.g. PBI, PBO), for example 5-95 wt % para-aramid fiber and 95-5 wt % of a fiber made from a rigid rod polymer other than aramid, preferably 10-90 wt % para-aramid fiber and 90-10 wt % of a fiber made from a rigid rod polymer other than aramid (based on the weight of the aramid fibrous material or based on the weight of the fibrous component of the aramid fibrous material).

The aramid fibrous material may comprise materials other than fibers and other than aramid polymer, e.g. low amounts of thermoplastic or thermosetting resin, organic or inorganic fillers, pigments, dyes and salts. Usually, the fibers of the aramid fibrous material will comprise finishes. Preferably, such materials other than fibers and other than aramid polymer are present in an amount of at most 20 wt %, more preferably at most 10 wt % and most preferably at most 5 wt % (based on the weight of the aramid fibrous material). Hazardous non-fibrous materials may be removed prior to further processing. For example, Fluor-containing finishes may be removed.

In one embodiment, the non-continuous aramid fiber comprised in the aramid fibrous material is selected from at least one of aramid short-cut (also referred to as aramid short-cut fiber), aramid pulp, aramid tape, aramid fibril and aramid fibrid. Short-cut comprises short filaments and may e.g. be obtained by cutting continuous yarn, fabrics or woven materials.

Pulp consists of short fibers which have been subjected to a shearing force leading to the formation of fibrils, which are mostly connected to a "stem" of the original fiber, while thinner fibrils peel off from the thicker fibrils. These fibrils are curly and sometimes ribbon-like, and show variations in length and thickness. Fibrids are small, non-granular, non-rigid film-like particles, wherein one of their dimensions is in the order of microns. A more precise definition is given in U.S. Pat. No. 2,999,788 wherein it is further defined that a fibrid particle must possess an ability to form a waterleaf. It further should have the ability to bond a substantial weight of staple fiber.

In one embodiment the aramid short-cut fiber has a length in the range of 0.1 to 20 mm, preferably 1 to 15 mm, more preferably 2 to 10 mm, even more preferably 3 to 8 mm.

Preferably, the aramid short-cut has a narrow length distribution.

In one embodiment, the length distribution of the aramid short-cut is such that at least 50 weight % of the filaments have a length which is within 30% of the length at a peak maximum in the length distribution curve. Preferably, at least 70 weight % of the filaments have a length which is within 30% of the length at a peak maximum in the length distribution curve.

In one embodiment, aramid short-cut of different lengths is combined, such that the length distribution is multimodal. In this embodiment, at least 90 weight %, preferably at least 95 weight % of the filaments have a length of at most 20 mm, preferably at most 10 mm, more preferably at most 8 mm.

In one embodiment, the non-continuous aramid fiber consists of aramid short-cut fiber.

The solvent used to dissolve the aramid fibrous material so as to form a spin dope comprising aramid is sulfuric acid.

Preferably, the sulfuric acid has a concentration of at least 95%, more preferably at least 98% and even more preferably of at least 99%.

In one embodiment the sulfuric acid has a concentration of at least 100%, or even at least 102%. Sulfuric acid having a concentration of more than 100% may be obtained by combining sulfuric acid and oleum.

Sulfuric acid with a concentration of at least 100% is especially suited to be combined with aramid fibrous material having a moisture content of more than 1 or 2 wt %.

Preferably, the aramid fibrous material has a moisture content of at most 10 wt %, preferably at most 5 wt % and more preferably at most 1 wt %.

The moisture content of the aramid fibrous material is determined by weighing 3-5 g of aramid fibrous material, heating it in a microwave for 3 min at 600 W to dry the aramid fibrous material and subsequently weighing the material again to determine the weight loss. Alternatively, a moisture analyzer using infrared irradiation at 140° C. may be used to measure the moisture content.

The sulfuric acid concentration maybe chosen such that it absorbs the water introduced with the aramid fibrous material. This water is then considered part of the solvent. The initial sulfuric acid concentration is chosen such that the sulfuric acid concentration in the solvent (including the water from the aramid fibrous material) is preferably at least 98%, or at least 99%, at least 99.5% or even at least 99.8%.

The sulfuric acid may be in liquid or solid form. Solid sulfuric acid is obtained by freezing sulfuric acid below its solidifying temperature.

Instant process is a continuous process. This means that the stage of mixing the aramid fibrous material and the sulfuric acid is continuous and/or the processing of the spin dope is continuous.

Preferably, in the instant process, the aramid fibrous material and the sulfuric acid are mixed in a mixing device with a continuous flow to result in a spin dope comprising aramid. Preferably, the mixing device has a continuous out-flow, the in-flow into the mixing device may be continuous or batch-wise. Preferably, there is a continuous flow after all components of the spin dope have been combined.

The mixing device may for example be a kneader or extruder, preferably a single shaft kneader, double shaft kneader, single screw extruder or twin screw extruder.

Preferably, the continuous out-flow of the mixing device is directly and continuously processed into continuous aramid fiber.

In the embodiment wherein solid sulfuric acid is used, the mixing takes place at an initial temperature in the range of −5 to 10° C., more preferably a temperature in the range of 0 to 8° C. Subsequently, the temperature of the aramid spin dope is increased to a temperature in the range of 50-100° C., preferably 70-90° C.

In the embodiment wherein liquid sulfuric acid is used, the mixing as well as the spinning of the mixed aramid spin dope takes place at a temperature in the range of 20 to 120° C., more preferably at a temperature in the range of 50 to 90° C.

In this embodiment, the mixing device is preferably used with settings that create a high shear rate for an efficient mixing of the aramid fibrous material and the sulfuric acid and subsequent dissolution of the aramid fibrous material.

In one embodiment of instant process, one spin dope is prepared based on liquid sulfuric acid and one spin dope is prepared based on solid sulfuric acid. Both spin dopes are subsequently combined to form a combined spin dope which is processed into continuous fibers.

The aramid fibrous material and the optionally present aramid polymer should remain in the sulfuric acid while being mixed in the mixing device for a residence time that is sufficient to ensure sufficient homogeneity of the spin dope comprising aramid. Preferably, the residence time in the mixing device is in the range of 5 minutes to 30 hours, dependent on the mixing device and the use of solid or liquid sulfuric acid. Where solid sulfuric acid is used, the residence time in the mixing device is preferably in the range of 4 to 30 hours, preferably 5 to 10 hours, where liquid sulfuric acid is used, the residence time is preferably in the range of 5 minutes to 4 hours. When a twin screw extruder is used, the residence time may be in the range of 5 to 30 minutes.

Preferably, the aramid spin dope has an aramid concentration of 12-22 wt %. Preferably, the spin dope has a para-aramid concentration of 15-21 wt %, even more preferably a para-aramid concentration of 18-20 wt %, based on the weight of the aramid spin dope. In another embodiment, the spin dope has a meta-aramid concentration of 12-20 wt %, preferably 15-18 wt %, based on the weight of the spin dope.

The concentration of polymer in the spin dope may be higher than the concentration of aramid in the embodiments where the aramid fibrous material comprises non-aramid fibers. The total concentration of polymer in the spin dope may be in the range of 12 to 30 wt %, preferably 14 to 25 wt %.

The spin dope may be filtered prior to further processing, e.g. to remove undissolved matter.

The aramid spin dope is processed into a continuous aramid fiber by the well-known dry-jet wet spinning process. This process is described in more detail for instance in U.S. Pat. Nos. 3,414,645 , 4,016,236. The dry-jet wet spinning process comprises extruding the liquid spin dope into a non-coagulating gaseous atmosphere, such as air, and immediately afterwards into a coagulation bath. In the air zone (also referred to as air gap) through which the spinning mass passes, the aramid is drawn.

After their coagulation the filaments formed are removed from the coagulation bath, washed, dried and taken up on a bobbin. In one embodiment, after a first washing step, the filaments are neutralized and washed again before being dried. The filaments may be subjected to a wet or hot drawing step before or after taking them up on a bobbin.

The air gap may have a length of 2-100 mm, preferably it has a length of 4-20 mm, more preferably of 6-15 mm.

The composition of the coagulation bath may vary. It may entirely or partly consist of water or other substances, such as bases, acids, salts and organic solvents.

The coagulation bath preferably consists of dilute aqueous sulfuric acid having a concentration of 0-40% by weight, preferably 5-20 wt %. According to one embodiment, the coagulation bath may consist of a diluted caustic aqueous solution e.g. an aqueous NaOH solution with a concentration of 0-10% by weight, preferably 0.05 to 5% by weight and in particular 0.1 to 1% by weight. According to another embodiment, the coagulation bath has a pH of between 4 and 11, preferably between 5 and 10 and in particular between 6 and 8. The coagulation bath may consist of water, in particular softened or demineralized water.

The temperature of the coagulation bath may have any value desired. Depending on the other spinning conditions the temperature of the coagulation bath is generally in the range of −10° C. to 50° C., and preferably between 0° C. and 25° C.

The spin dope comprising aramid may comprise aramid other than the aramid derived from the non-continuous aramid fibers, preferably virgin aramid polymer.

In such embodiments of the process, to-be-recycled aramid fibrous material and virgin aramid polymer are both used in combination as source for the aramid of the spin dope. Thus, aramid fibrous material, sulfuric acid and virgin aramid polymer are combined with sulfuric acid to obtain a spin dope.

In one embodiment, the aramid fibrous material may further comprise virgin aramid polymer.

In the context of instant application, virgin aramid polymer refers to aramid polymer which has not been processed into shaped or oriented articles by a solvent-based spinning process prior to instant process. Such virgin aramid polymer may be obtained by polymerization. The virgin aramid polymer may have been washed and dried after polymerization. The virgin aramid polymer may be in the form of crumbs or powder.

In the case where virgin para-aramid polymer is used, this has not been in contact with sulfuric acid prior to instant process. Such virgin para-aramid polymer has a sulfonic acid group content of at most 0.5 meq/kg of polymer, preferably at most 0.1 meq/kg.

In contrast to the virgin aramid polymer, the non-continuous aramid fiber comprised in the aramid fibrous material has previously been in contact with a spinning or processing solvent, such as sulfuric acid, especially if the aramid fibrous material has been spun from sulfuric acid. This is generally the case for aramid fibrous material comprising poly(para-phenylene terephthalamide) (PPTA) non-continuous fibers. This material to be recycled has been in contact with sulfuric acid when it was originally produced. Hence, such non-continuous para-aramid fiber may have a sulfonic acid group content of at least 1 meq/kg of fiber, usually at least 5 meq/kg of fiber.

The sulfonic acid group content of the virgin aramid polymer is determined after degradation of the polymer. This is done by dissolving the aramid in methane sulfonic acid with approximately 2% water and heating to 85° C. for at least 100 hours. Subsequently, high performance liquid chromatography (HPLC, column: Phenomenex Gemini C18; 150×4.6 mm; dp=5 µm, Temperature: 40° C., Flow: 1.0 ml/min, Eluent A: ammonium acetate buffer 0.01 M pH 8.3, Eluent B: methanol) is performed on the yielded monomers to determine the number of sulfonic acid groups. HPLC is performed using a gradient program from eluent A to eluent B as follows: At the start the flow contains 100% eluent a, this is maintained for 5 minutes. Subsequently, the eluent is switched to 20% A and 80% over a period of 1 min, and maintained at this composition for 5 more minutes. Next, the eluent is switched back to 100% A over a period of 1 minute, after which this is maintained for 5 more minutes before the experiment is ended.

The sulfonic acid group content of the continuous aramid fiber (including the (meta-)aramid blend fiber), the aramid fibrous material and non-aramid fibers is determined in the same way as for the virgin aramid polymer.

In the context of the present specification aramid refers to an aromatic polyamide comprising or consisting of aromatic fragments directly connected to one another via amide fragments. Methods to synthesize aramids are known to those skilled in the art and typically involve the polycondensation of aromatic diamines with aromatic diacid halides. Aramids may exist in the meta- and para-form, both of which may be used.

For the purpose of this application, the term para-aramid refers to a class of wholly aromatic polyamide polymers and copolymers having at least 60%, preferably at least 80% and more preferably at least 90% of para-oriented bonds between the aromatic moieties. In one embodiment, at least 95% or all (i.e. 100%) of the bonds are para-oriented bonds.

Typical para-aramids are poly(para-phenylene terephthalamide) (PPTA), poly(4,4'-benzanilide terephthalamide), poly(para-phenylene-4,4'-biphenylene dicarboxamide) and poly(para-phenylene-2,6-naphthalene dicarboxamide), 5,4'-diamino-2-phenylbenzimidazole or poly(para-phenylene-co-3,4'-oxidiphenylene terephthalamide) or copolymers thereof.

For the purpose of this application, the term meta-aramid refers to a class of wholly aromatic polyamide polymers and copolymers having at least 60%, preferably at least 80% and more preferably at least 90% of meta-oriented bonds between the aromatic moieties. In one embodiment, at least 95% or all (i.e. 100%) of the bonds are meta-oriented bonds. The amide bonds between the aromatic moieties are thus located substantially in the meta-oriented or nearly meta-oriented positions of the aromatic rings (as e.g. in a 1,3-phenylene group or 1,3-naphthalene group). In one embodiment, the meta-aramid is co-poly(m-phenylene isophthalamide) comprising at most 5 molar % of aromatic moieties other than m-phenylene. In another embodiment, the meta-aramid is poly(m-phenylene isophthalamide).

For the purpose of this application, the term aramid encompasses polyamide-imides which are commonly classified as meta-aramid. These polyamide-imides are produced by the polycondensation of diisocyanate (e.g. phenylene diisocyanate) with an acid anhydride (e.g. trimellitic anhydride). A fiber derived from such aromatic polyamide-imide is marketed under the brand Kermel®. Preferably, the non-continuous aramid fiber comprises or consists of either poly(para-phenylene terephthalamide) (PPTA) and/or poly (m-phenylene isophthalamide).

In one embodiment, the aramid fibrous material or at least a part thereof is subjected to movement to agglomerate the aramid fibrous material before combining the agglomerated aramid fibrous material with sulfuric acid. In this step, the aramid fibrous material is formed into a particulate shape that allows easy dosing. The particulate shape of the agglomerated aramid fibrous material differs from the shape of the aramid fibrous material before agglomeration. By the agglomeration, the non-continuous aramid fibers are interlinked, and densified. Thus, the agglomerated aramid fibrous material in form of particles has a higher density and lower surface area compared to the same amount by weight as the aramid fibrous material. Preferably, the particles are free-flowing, i.e. they are separate particles that do not entwine with or stuck or adhere to each other.

Good control of dosing allows an efficient and well-controllable continuous process. The terms "particle" and "particulate" may be used interchangeably and refer to discrete three dimensionally shaped objects. The particles can have any of a variety of shapes, including, for example, generally spherical, elongated, bean shaped or egg shaped. In certain embodiments, the particles have an aspect ratio of from 1:1 (a perfect sphere) up to 1:100, up to 1:50, up to 1:20, or, in some cases, up to 1:10 or up to 1:5. As used herein, the "aspect ratio" of a particle is the ratio of the length of the shortest dimension of the particle to the length of the longest dimension of the particle.

Preferably, the agglomerated aramid fibrous material has an average particle size in the range of 1 to 30 mm, preferably 5 to 20 mm, where the particle size refers to the length of the longest dimension of the particle.

In one embodiment the movement to which the aramid fibrous material is subjected is selected from stirring, shifting, tumbling, shaking, vibrating, falling, turning, cyclone mixing and vortex mixing or any combination thereof.

In the embodiment where the aramid fibrous material comprises non-continuous aramid fiber and virgin aramid polymer, the non-continuous aramid fiber and the virgin aramid polymer may be pre-mixed to result in a solid pre-mix before being combined with the sulfuric acid.

In a preferred embodiment, the solid pre-mix consists of aramid fibrous material comprising non-continuous aramid fibers and virgin aramid polymer. As explained above, the aramid fibrous material may additionally comprise other, non-aramid fibers and non-fibrous material other than the virgin aramid polymer.

In an embodiment, the solid pre-mix consists of non-continuous aramid fibers and virgin aramid polymer. The aramid fibrous material comprising non-continuous aramid fibers and virgin aramid polymer may also be subjected to movement to agglomerate the aramid fibrous material, as described above.

Alternatively, the non-continuous aramid fiber and the virgin aramid polymer may be added separately to the sulfuric acid, either simultaneously, alternatingly or successively.

In one embodiment, the process comprises the steps of:
combining aramid fibrous material comprising non-continuous aramid fibers with sulfuric acid to obtain a first spin dope comprising aramid, combining virgin aramid polymer and sulfuric acid to obtain a second spin dope comprising aramid,
combining said first spin dope and said second spin dope, and
processing the combination of said first spin dope and said second spin dope into a continuous aramid fiber.

In one embodiment of this process, the first spin dope is prepared with liquid sulfuric acid and the second spin dope is prepared with solid sulfuric acid. Both spin dopes may be combined in a kneader or extruder, e.g. by dosing the spin dope prepared with solid sulfuric acid into a kneader or extruder comprising the spin dope prepared with liquid sulfuric acid (or vice versa).

In the embodiments where the aramid fibrous material, the spin dope or the combination of first spin dope and second spin dope comprises non-continuous aramid fiber and virgin aramid polymer, both sources of aramid will eventually be dissolved in the sulfuric acid.

In one embodiment the non-continuous aramid fiber provides 1 to 99 wt %, preferably 2 to 80 wt % or 5 to 60 wt %, more preferably 10 to 30 wt % of the total amount of aramid in the aramid spin dope (based on the weight of aramid in the spin dope).

In one embodiment the virgin aramid polymer provides 99 to 1 wt %, preferably 98 to 20 wt % or 95 to 40 wt %, more preferably 90 to 70 wt % of the total amount of aramid in the aramid spin dope (based on the weight of aramid in the spin dope). In one embodiment the non-continuous aramid fiber and the virgin aramid polymer each provide 50 wt % of the total amount of aramid in the aramid spin dope. The ratio between [non-continuous aramid fiber] and [virgin aramid polymer] of the total amount of aramid in the aramid spin dope may be in the range of 1:99 to 99:1, preferably 2:80 to 80:2, more preferably 10:90 to 90:10 or 30:70 to 70:30. Preferred is a ratio of 40:60 to 60:40.

In a preferred embodiment, the continuous process for the recycling of aramid fiber comprises the following steps:
combining aramid fibrous material comprising non-continuous aramid fibers with sulfuric acid to obtain an aramid spin dope, and
processing the aramid spin dope into a continuous aramid fiber, wherein the aramid fibrous material further comprises virgin aramid polymer and the aramid fibrous material is agglomerated into particles before combining the agglomerated aramid fibrous material with sulfuric acid.

In a more preferred version of this embodiment, the non-continuous aramid fiber is aramid short-cut, preferably having a length in the range of 0.1 to 20 mm, more preferably in the range of 1 to 10 mm.

In another embodiment, the continuous process for the recycling of aramid fiber comprises the following steps:
agglomerating aramid fibrous material comprising non-continuous aramid fibers,
the agglomerated aramid fibrous material is combined with sulfuric acid to obtain an aramid spin dope, and
processing the aramid spin dope into a continuous aramid fiber.

In this embodiment it is preferred that the non-continuous aramid fiber is aramid short-cut, preferably having a length in the range of 0.1 to 20 mm, more preferably in the range of 1 to 10 mm.

The application also pertains to a continuous aramid fiber obtainable by the described process, in any of its embodiments.

The application further pertains to a continuous aramid fiber, preferably obtainable by instant process, comprising a polymer blend comprising aramid and non-aramid polymer.

A non-aramid polymer is a polymer other than aramid. Preferably, the polymer blend comprises at least 1 wt % and at most 99 wt % of aramid, preferably meta-aramid, preferably at least 20 wt % of aramid and at most 80 wt % of aramid, preferably meta-aramid (based on the weight of the fiber).

Preferably, the polymer blend comprises at least 50 wt % and at most 99 wt % of meta-aramid (based on the weight of the fiber). The polymer blend comprises at least 1 wt % and at most 49 wt % of non-aramid polymer. A continuous aramid fiber comprising a polymer blend comprising (meta-)aramid may be referred to as "(meta-)aramid blend fiber".

In the context of this application, a polymer blend refers to a mixture of at least two macromolecular substances, polymers or copolymers. A continuous aramid fiber comprising a polymer blend is produced from a spin dope comprising sulfuric acid, (meta-)aramid polymer and non-aramid polymer. The (meta-)aramid polymer and the non-aramid polymer can be miscible or immiscible. A fiber comprising a polymer blend is different from a combination of filaments prepared from different polymers.

Preferably, the continuous aramid fiber, in particular the (meta-)aramid blend fiber, has a sulfonic acid group content of at least 0.001 wt % (mass/mass fiber).

Generally, the sulfonic acid group content is at most 1 wt %, preferably at most 0.5 wt %, more preferably at most 0.3 wt %. Alternatively, this may also be expressed in parts per million resulting in a sulfonic acid group content of >1 ppm, preferably 5-300 ppm, more preferably 10-100 ppm.

The continuous aramid fiber comprising a polymer blend may also be manufactured by dissolving the aramid polymer, preferably meta-aramid polymer, and the non-aramid polymer in a suitable solvent (e.g. sulfuric acid or an amide solvent) to obtain a spin dope and processing the spin dope by known methods to obtain continuous fibers.

The non-aramid polymer is preferably selected from at least one of a natural polymer, a regenerated polymer, a thermoplastic polymer and a rigid rod polymer other than aramid. Thermoplastic polymers are well known and include e.g. acrylic polymer (e.g. modacryl), polyamide (such as e.g. Nylon) and polyester. Natural and regenerated polymers include e.g. cotton, cellulose and viscose (e.g. Rayon or Lyocell). A rigid rod polymer other than aramid is e.g. polybenzimidazole (PBI) and polybenzobisoxazole (PBO).

The polymer blend may comprise meta-aramid, para-aramid and at least one of a non-aramid polymer.

In one embodiment, the polymer blend comprises meta-aramid, para-aramid and non-aramid polymer, the non-aramid polymer preferably being a polymer resulting in antistatic fibers.

Preferred is an embodiment wherein the polymer blend comprises 50-98 wt % meta-aramid, 1-49 wt % para-aramid and 1-49 wt % non-aramid polymer, preferably 55-95 wt % meta-aramid, 3-10 wt % para-aramid and 2-35 wt % non-aramid polymer (based on the weight of the fiber).

In one embodiment, the polymer blend comprises 65 to 95 wt % of meta-aramid, 1 to 34 wt % of para-aramid and 1 to 4 wt % non-aramid polymer, in particular 93 wt % of meta-aramid, 5 wt % of para-aramid and 2 wt % of non-aramid polymer. In these embodiments, the non-aramid polymer preferably is a polymer capable of providing fibers with antistatic properties. Acrylic polymer (e.g. polyacrylonitrile), polyamide and polyesters may provide antistatic properties. The acrylic polymer may comprise electrically conductive carbon or other conductive microparticles.

In another embodiment, the polymer blend comprises para-aramid and a rigid rod polymer other than aramid (e.g. PBI, PBO), for example 5-95 wt % para-aramid and 95-5 wt % of a rigid rod polymer other than aramid, preferably 10-90 wt % para-aramid and 90-10 wt % of a rigid rod polymer other than aramid (based on the weight of the fiber).

Instant process is advantageous for the recycling of hybrid fabrics comprising meta-aramid fibers, para-aramid fibers and other fiber (e.g. antistatic fibers) which occur regularly on the market. As a result of this embodiment of the recycling process, a meta-aramid blend fiber may be obtained which has attractive properties. While the hybrid fabric comprises three types of fibers, each made from a different polymer, the meta-aramid blend fiber is made from a polymer blend obtained from a combination of those polymers.

In one embodiment, the continuous aramid fiber, in particular the meta-aramid blend fiber, shows improved dyeing behavior, in particular when cationic dyes are used.

Hence, the application also pertains to a continuous aramid fiber, in particular a meta-aramid blend fiber (as defined above) comprising a cationic dye.

When dyed, the continuous aramid fiber, in particular the meta-aramid blend fiber, is stained throughout the whole cross section of the filament. Also, after having been dyed with one dye, the meta-aramid blend fiber may be easily re-dyed with another dye.

In one embodiment, the continuous aramid fiber, in particular the (meta-)aramid blend fiber including a polymer phase other than meta-aramid, preferably other than aramid, is insoluble in organic solvents which means that at most 0.1 wt % of the fiber dissolves in organic solvent.

In one embodiment, the continuous aramid fiber, in particular the (meta-)aramid blend fiber, has an organic solvent content of below 250 ppm, preferably below 100 ppm, more preferably below 50 ppm, corresponding to an organic solvent content of below 0.025 wt % (based on the weight of the yarn), preferably below 0.01 wt %, more preferably below 0.005 wt %. This means that the combined content of organic solvents, in particular NMP (N-methyl pyrrolidone), THF (tetrahydrofuran) and DMAc (dimethyl acetamide) is below 250 ppm, preferably below 100 ppm and more preferably below 50 ppm.

Continuous aramid fibers having an organic solvent content below 100 ppm may be referred to as "substantially free of organic solvents". A very low residual organic solvent content may be the result of the solvents used during polymerization of the polymers contained in the polymer blend.

The organic solvent content may be determined by different methods, depending on the specific organic solvent. Generally, gas chromatography (GC), NMR (nuclear magnetic resonance) and MS (mass spectrometry) are suitable to determine the organic solvent content, e.g. the NMP or DMAc content, of the continuous aramid fibers. In the context of the current invention, the organic solvent content is determined by gas chromatography. About 1.0 mg of fiber is collected and heated over 500° C. in an electric furnace. Gas chromatography (Shimadzu Corporation, Ltd., Model: GC-2010) is used to measure the amide solvent amount vaporized from the fiber. Subsequently, the residual solvent concentration in the fiber is calculated by using an calibration curve prepared by using an amide-based solvent as a standard sample.

Also claimed is a multifilament yarn comprising the continuous aramid fiber obtainable by instant process or the continuous aramid fiber, in any of their embodiments as described above.

Preferably, the multifilament yarn, in particular the multifilament yarn comprising para-aramid fiber obtained by instant process, has a modulus of at least 50 GPa, a breaking tenacity (tenacity at break) of at least 1800 m N/tex and an elongation at break below 4%, more preferably a modulus of at least 90 GPa, a breaking tenacity of at least 2200 mN/tex and an elongation at break below 3.4%. Preferably, the multifilament yarn, in particular the multifilament yarn comprising meta-aramid blend fiber obtained by instant process has a breaking tenacity of at least 200 mN/tex and an elongation at break of at least 10%, more preferably a breaking tenacity of at least 250 mN/tex and an elongation at break of at least 15%, even more preferably a breaking tenacity of at least 300 mN/tex and an elongation at break of at least 20%.

The breaking tenacity and modulus are determined according to ASTM D7269 after conditioning at 20° C. and 65% relative humidity for 14 hours in accordance with ASTM D1776.

Thus, the multifilament yarn may have similar properties as multifilament yarn spun from 100% of virgin aramid polymer.

However, the process may also be used to prepare continuous aramid fibers, in particular multifilament yarn, having lower mechanical properties but being produced at lower costs, because less or no virgin aramid polymer is required for the process. By using the process of the application and the fibers obtained by it, a more sustainable and circular aramid production process is possible which results in a reduction of the carbon footprint of the continuous aramid fiber. The application also pertains to a textile sheet, preferably a fabric, comprising the multifilament yarn or the continuous aramid fiber as described above.

The fibers of present invention, in particular the meta-aramid blend fibers, may be used for textile applications, e.g. in textile sheets, including knitted and woven fabrics, or cords used as reinforcement of hoses, in protective apparel, especially for fire-resistant application.

Hence, the application also pertains to protective clothing comprising the textile sheet.

The invention is further illustrated by the following, non-limiting examples.

Example 1: Dissolving and Respinning of Dried Pulp

Aramid pulp (Twaron® pulp type 1092) was dried to a moisture content of <1.5%. This dried pulp was used for the preparation of spin dope having an aramid concentration of ca. 19.8 wt % by mixing with 99.8% solid sulfuric acid. Mixing was performed in a Nauta mixer (Hosokawa, 1000 L) for 20 hours. Mixing was started at a temperature of 8° C. and during mixing the temperature increased to a final temperature of 20° C. (spin dope 1)

In the same way, an aramid spin dope was prepared by combining virgin aramid polymer (p-phenylene terephthalamide) and sulfuric acid (spin dope 2).

From both spin dopes and from a 50:50 mixture of both spin dopes, multifilament aramid yarn was spun using a dry-jet wet spinning process. This was done by dosing the solid spin dopes into a kneader where it is heated to 85° C. to obtain a liquid spin dope. In the kneader, the dope is transported to the outlet where it is fed to a series of pumps. After filtration, the liquid spin dope is extruded through a spinneret containing 1000 holes of 59 μm into air where it is drawn, and immediately afterwards into a coagulation bath. After their coagulation the filaments formed were removed from the coagulation bath, washed, neutralized, washed again, dried and taken up on a bobbin. The yarn was spun with a linear density of ca. 930 dtex.

The mechanical properties for the three multifilament yarns were determined according to ASTM D7269 after conditioning at 20° C. and 65% relative humidity for 14 hours in accordance with ASTM D1776. The results are shown in table 1.

TABLE 1

| Properties of multifilament yarns | | | | |
|---|---|---|---|---|
| Sample | Aramid origin | Tenacity at Break (mN/tex) | Modulus (GPa) | Elongation at Break (%) |
| 1 (comp.) | 100% virgin aramid polymer | 2547 | 105 | 3.2 |
| 2 (inv.) | 50% aramid pulp/50% virgin aramid polymer | 2570 | 107 | 3.2 |
| 3 (inv.) | 100% aramid pulp | 2513 | 107 | 3.2 |

The results presented in Table 1 show that yarn prepared from a spin dope made from aramid pulp or based on a mixture of aramid pulp and virgin aramid polymer has comparable properties to yarns prepared from a spin dope based on virgin aramid polymer. This shows the effectiveness of this recycling approach.

Example 2

An aramid spin dope was prepared based on a solid pre-mix of 6 mm short-cut aramid fiber (Twaron®, T1080) with virgin aramid polymer (p-phenylene terephthalamide) in a 1:1 ratio. Equal amounts of 6 mm short-cut aramid fiber and virgin aramid polymer were weighed in a barrel which was placed on a rollerbank for 64 h. After, the mixture was used for the preparation of spin dope having an aramid concentration of ca. 19.8 wt % by mixing with 99.8% solid sulfuric acid. Mixing was performed in a Nauta mixer (Hosokawa, 1000 L) for 20 hours. Mixing was started at a temperature of 8° C. and during mixing the temperature increased to a final temperature of 20° C. (spin dope 3)

Furthermore, an aramid spin dope was prepared in a similar fashion by combining 100% 6 mm short-cut aramid fiber, instead of the 1:1 mixture of 6 mm short-cut aramid fiber and virgin aramid polymer, and sulfuric acid (spin dope 4).

From spin dope 2 (100% virgin aramid polymer), spin dope 3, and spin dope 4 multifilament yarns were spun in the same way as for example 1. Again, the mechanical properties of the yarns were determined. The mechanical properties are shown in table 2.

TABLE 2

| Properties of multifilament yarn | | | | |
|---|---|---|---|---|
| Sample | Aramid origin | Tenacity at Break (mN/tex) | Modulus (GPa) | Elongation at Break (%) |
| 1 (comp.) | 100% virgin aramid polymer | 2547 | 105 | 3.2 |
| 4 (inv.) | 50% aramid short-cut/50% virgin aramid polymer | 2508 | 106 | 3.2 |

TABLE 2-continued

Properties of multifilament yarn

| Sample | Aramid origin | Tenacity at Break (mN/tex) | Modulus (GPa) | Elongation at Break (%) |
|---|---|---|---|---|
| 5 (inv.) | 100% aramid short-cut | 2307 | 93 | 3.3 |

The results in Table 2 again show that a spin dope comprising recycled aramid fiber may yield multifilament yarn with mechanical properties comparable to multifilament yarn prepared from 100% virgin aramid polymer.

Example 3

This example demonstrates the recycling of fabrics made from a mix of fibers, in this particular instance made of 93 wt % meta-aramid fibers, 5 wt % para-aramid fiber, and 2 wt % acrylic-based antistatic fiber. The fabric was shredded into small pieces having a maximum dimension of 20 mm. Subsequently, liquid sulfuric acid was added to the fibers and using a SpeedMixer (DAC 800) the fibers were dissolved to prepare batches of spin dope based on 16 wt % fiber. Mixing was done for 90 seconds at 1400 rpm to maintain a maximum temperature of 60° C.

Several batches of spin dope were combined in a vessel (spin dope 5). The spin dope was continuously fed to a twin screw extruder where it was heated to 35° C.

After the extruder, the liquid spin dope was filtered and extruded through a spinneret containing 106 holes of 65 µm into air where it was drawn, and immediately afterwards into a coagulation bath. After their coagulation the filaments formed were removed from the coagulation bath, washed, neutralized, washed again, dried, heat treated at ~280° C. and taken up on a bobbin. After coagulation, during washing, and during heat treatment drawing was applied.

The mechanical properties of the multifilament yarn produced in this way are shown in table 3.

TABLE 3

Mechanical properties of multifilament yarn from recycled aramid-hybrid fabric

| Sample | Aramid origin | Tenacity at Break (mN/tex) | Linear Density (dtex) | Elongation at Break (%) |
|---|---|---|---|---|
| 6 (inv.) | Shredded fabric consisting of 93% meta-aramid, 5% para-aramid, and 2% acrylic-based antistatic fiber | 343 | 233 | 21.3 |

The results of Table 3 show that a fabric consisting of a mix of fibers made of different polymers, among them fibers containing aramid, can be spun into a filament yarn with properties suitable in various applications.

When dyed, the fibers obtained by this process show improved penetration of dye throughout the filament cross section, as shown by FIG. 1 in comparison to regular meta-aramid fibers (Teijinconex® Neo). FIG. 1 shows cross sectional images of recycled yarn before dyeing (left image, sample 6) and after dyeing with a blue dye (middle image). The right image shows a regular meta-aramid fiber (Teijinconex® Neo) obtained from virgin meta-aramid polymer (no recycling) and dyed with the same dye as sample 6. From FIG. 1 can be observed that when dyeing the recycled fiber, the dye penetrates all the way to the core of the filaments. In contrast, when dyeing the regular meta-aramid fiber the core of the filaments remains undyed.

The invention claimed is:

1. A continuous process for the recycling of aramid fiber comprising the following steps:
    combining aramid fibrous material comprising non-continuous aramid fibers with sulfuric acid to obtain a spin dope comprising aramid, and
    processing the spin dope comprising aramid into a continuous aramid fiber.

2. The process of claim 1 wherein the spin dope comprising aramid comprises aramid other than the aramid derived from the non-continuous aramid fibers.

3. The process of claim 1 wherein the aramid fibrous material comprises virgin aramid polymer.

4. The process according to claim 1, wherein the non-continuous aramid fiber comprises as least one of aramid short-cut, aramid pulp, aramid fibril and aramid fibrid.

5. The process of claim 4, wherein the aramid short-cut has a length in the range of 0.1 to 20 mm.

6. The process according to claim 1 wherein the sulfuric acid is liquid or solid.

7. The process according to claim 1 wherein the aramid fibrous material or part thereof is subjected to movement to agglomerate the aramid fibrous material before combining the agglomerated aramid fibrous material with sulfuric acid.

8. The process according to claim 7 wherein the movement is selected from stirring, shifting, tumbling, shaking, vibrating, falling, turning, cyclone mixing and vortex mixing or any combination thereof.

9. The process according to claim 1, wherein aramid is para-aramid.

10. The process according to claim 1 wherein the non-continuous aramid fiber provides 1 to 99 wt % of the total amount of aramid in the spin dope comprising aramid.

11. The process according to claim 2 wherein the aramid fibrous material is a solid pre-mix of non-continuous aramid fiber and virgin aramid polymer.

12. The process according to claim 2 wherein aramid fibrous material, sulfuric acid and virgin aramid polymer are combined with sulfuric acid to obtain a spin dope.

13. The process according to claim 2 comprising the steps of
    combining aramid fibrous material comprising non-continuous aramid fibers with sulfuric acid to obtain a first spin dope comprising aramid,
    combining virgin aramid polymer and sulfuric acid to obtain a second spin dope comprising aramid,
    combining the first spin dope and the second spin dope, and
    processing the combination of the first spin dope and the second spin dope into a continuous aramid fiber.

* * * * *